Patented Oct. 1, 1940

2,216,233

UNITED STATES PATENT OFFICE 2,216,233

CELLULOSE DERIVATIVE EMULSIONS

Alfred Dreyling, South River, and William W. Lewers, Highland Park, N. J., assignors to E. I. du Pont de Nemours & Company, Wilmington, Del., a corporation of Delaware No Drawing. Application December 4, 1937, Serial No. 178,070

6 Claims. (Cl. 134—79)

This invention relates to emulsions, and more particularly to new compositions of matter containing a cellulose derivative emulsion which is characterized by unusual stability and high film-forming ingredient content. This application is a continuation in part of our copending application Serial No. 36,388, filed November 2, 1935.

At the present time, emulsions are of considerable commercial importance and particularly emulsions of the oil-in-water type. The present invention is of this type and contains a colloided cellulose derivative which may be considered the oil or dispersed phase, and water is the continuous or outside phase of the emulsion.

Heretofore, emulsions have been prepared by colloiding cellulose nitrate with a high percentage of solvents which are immiscible with water. Non-solvent softeners may also be added to the colloided nitrocellulose after which the solution is added with rapid agitation to water to which has previously been added a suitable emulsifying agent. Emulsions have also been prepared in other ways such as by homogenizing, high speed mixing, and low speed mixing. The latter method has advantages, but heretofore it has been considered impractical and high speed or homogenization methods have been used almost exclusively. High speed processes can only be used for liquids which are relatively mobile at temperatures of 100° C., or less. Homogenization processes involve the use of a colloid mill or homogenization valve through which the mixture of ingredients are passed to form an emulsion which is generally characterized by good stability. When cellulose nitrate emulsions are prepared by the prior art methods stable products may be obtained if the film-forming content is low, but these are of comparatively small importance commercially. If emulsions are prepared having a high film-forming solids content, the stability is relatively poor and therefore there is an urgent need in the art for a stable cellulose derivative emulsion having a high film-forming content.

This invention has an object the provision of a process for preparing aqueous cellulose derivative emulsions having unusual stability and a high film-forming content.

Another object of the invention is the provision of cellulose derivative emulsions which are capable of regeneration by simple stirring after they have been frozen and thawed.

Another object of the invention is the provision of an aqueous cellulose derivative emulsion which is stable in either acid or basic media.

A still further object is the provision of a method of preparing cellulose derivative emulsions which are useful industrially for coating and impregnating purposes.

Other objects will be apparent as the description of the invention proceeds.

These objects are accomplished according to the present invention by mixing a relatively stiff cellulose derivative colloid with an aqueous dispersion of gum ghatti and an emulsifying agent of the polar type to form a paste type oil-in-water emulsion having a high film-forming ingredient content and excellent stability.

More specifically, the invention is carried out in its simplest form by mixing the cellulose derivative colloid with the water at a relatively low speed. This step is unusual since heretofore only liquids which very readily emulsify may be treated satisfactorily by simple mixing.

The following examples are given to illustrate some of the methods by which the invention may be carried out, but it will be understood that it is not limited to the examples except as set forth by the appended claims:

EXAMPLE 1

*First portion*

|  | Per cent |
|---|---|
| Cellulose nitrate, ⅜ sec. viscosity | 18.30 |
| Water | 7.80 |
| Blown castor oil | 24.20 |
| Butyl acetate | 14.10 |
| Amyl alcohol | 8.30 |
| Shellac | 4.80 |

*Second portion*

|  |  |
|---|---|
| Gum ghatti (water soluble) | .80 |
| Sodium benzoate | .04 |
| Isopropyl naphthalene sodium sulfonate | .35 |
| Water | 17.31 |

*Third portion*

|  |  |
|---|---|
| Ethylene glycol monobutyl ether | 1.00 |
| Water | 3.00 |

100.00

The first portion is prepared by charging the ingredients into a kneading machine such as a Werner and Pfleiderer mixer, in the proportions indicated and kneading for approximately 1½ hours or until the mass becomes smooth and free from undissolved material, after which the charge is removed from the mixer. The second portion is conveniently prepared by means of a rapid agitator mixer, whereby a homogeneous dispersion is secured. This intermediate dispersion is then charged into a kneading machine and the first portion is added gradually during kneading. This kneading action is continued until emulsification is complete; i. e., when the first portion gradually dispersing as globules within the second portion which forms the continuous phase. By complete emulsification is meant when a uniform predetermined particle size is reached which may be determined by microscopic examinations. The third portion is added slowly after emulsification is complete. The ethylene glycol monobutyl ether apparently acts as a plasticizer for the gum ghatti when the emulsion is subjected to freezing conditions. In addition, this ingredient assists the polar type emulsifying agent in lowering interfacial tension between the water phase and the cellulose nitrate colloid by virtue of its solubility in both phases. As in the case of the ethylene glycol mono-ethyl ether shown in our co-pending application Serial No. 36,388, this compound may be defined as an "introfier."

In this example when the "First portion" is kneaded, an emulsion is formed with the water as the inside phase. When the "First portion" and "Second portion" are combined and kneading continued, the phase relationship is inverted and the water becomes the outside phase, a condition which is generally most desirable industrially. The same conditions exist for other examples described herein where water wet cellulose nitrate is used in preparing the "First portion."

An alternative procedure provides for the addition of the preformed "Second portion" to the previously colloided cellulose nitrate "First portion" in a kneading machine with continued kneading until emulsification is complete as determined by microscopic particle size measurements. The "Third portion" is then added as in the above described procedure. This method may also be employed as an alternative method for preparing other examples that follow.

In Example 1, the cellulose nitrate is utilized in the water wet state; the water content amounting to approximately 30% of the water wet product. This is of particular advantage in that the customary step of dehydrating the cellulose nitrate is eliminated, thereby affording operating economy. In addition, the colloiding of the cellulose nitrate is greatly facilitated, since the difficultly colloided lumps caused by packing of the cellulose nitrate during the dehydration operation are eliminated.

Clear continuous films possessing excellent oil resistance result when the above emulsion is applied to paper and allowed to dry free from volatile constituents.

EXAMPLE 2

First portion

| | Per cent |
|---|---|
| Cellulose nitrate, 20 sec. viscosity | 18.80 |
| Water | 8.10 |
| Castor oil | 17.50 |
| Isobutyl acetate | 35.50 |
| Isobutyl alcohol | 1.30 |
| Tricresyl phosphate | 8.10 |

Second portion

| | |
|---|---|
| Gum ghatti (water soluble) | .70 |
| Sodium benzoate | .02 |
| Isopropyl naphthalene sodium sulfonate | .20 |
| Toluol | .40 |
| Water | 8.28 |

Third portion

| | |
|---|---|
| Ethylene glycol monobutyl ether | 1.10 |
| | 100.00 |

The above formula is prepared in a manner similar to that described under Example 1, and illustrates the use of gum ghatti as a stabilizing agent for compositions containing many of the ingredients used in conventional cellulose nitrate lacquers. The composition when applied to textiles and dried at approximately 80° C. yields films which serve as an excellent fibre anchorage medium.

EXAMPLE 3

First portion

| | Per cent |
|---|---|
| Cellulose nitrate, 3 sec. viscosity | 12.00 |
| Isobutyl alcohol | 6.00 |
| Blown castor oil | 35.00 |
| Ester gum | 9.80 |
| Isobutyl acetate | 7.80 |
| Amyl acetate | 8.00 |

Second portion

| | |
|---|---|
| Gum ghatti (water soluble) | .60 |
| Sodium benzoate | .05 |
| Sodium lauryl sulfate | .45 |
| Water | 19.30 |

Third portion

| | |
|---|---|
| Ethylene glycol monobutyl ether | 1.00 |
| | 100.00 |

The above formula is prepared in a manner similar to that described under Example 1.

The cellulose nitrate in this example was dehydrated with isobutyl alcohol, but suitable emulsions may also be prepared from cellulose nitrates which have been dehydrated with other liquids, such as propyl alcohol, isopropyl alcohol, etc. Ethyl alcohol may be used, although it is not preferred.

Clear continuous films result when the emulsion obtained from the above formula is applied to paper and textiles.

EXAMPLE 4

First portion

| | Per cent |
|---|---|
| Cellulose nitrate, 15 sec. viscosity | 18.8 |
| Water | 9.7 |
| Raw castor oil | 17.5 |
| Tricresyl phosphate | 8.1 |
| Isobutyl acetate | 35.5 |
| Isobutyl alcohol | 1.3 |

Second portion

| | |
|---|---|
| Gum ghatti (water soluble) | 0.1 |
| Polyvinyl alcohol | 0.1 |
| Isopropyl naphthalene sodium sulfonate | 0.2 |
| Toluol | 0.4 |
| Water | 7.2 |

Third portion

| | |
|---|---|
| Ethylene glycol monobutyl ether | 1.1 |
| | 100.0 |

It is desirable to add to the above composition about 10% by weight of a preservative, such as sodium benzoate, based on the gum ghatti content in order to prevent deterioration of this water soluble gum during extended storage periods.

The inclusion of polyvinyl alcohol affords an important improvement in the water resistant properties of coatings produced from this composition. This agent which is substituted for part of the gum ghatti permits the use of substantially lesser amounts of emulsifying agents required to produce an emulsion of superior stability. The polyvinyl alcohol appears to function primarily as a water colloided viscous type emulsifying agent, although it is believed to have a certain minor effect as a polar type agent. Polyvinyl alcohols having saponification values between 80 and 190 are generally preferred. It has also been determined that greater efficiency is obtained when polyvinyl alcohols having saponification values between 125 and 145 are utilized, particularly when the proportions of the emulsifying agents employed are low.

The above examples illustrate the invention where emulsions are prepared from cellulose nitrate. The invention is also applicable to the use of other cellulose derivatives such as cellulose acetate and the cellulose ethers; however, when these derivatives are used, the percentage of solids is not as high as when the nitrate is used. The invention nevertheless yields emulsions of the cellulose derivatives other than the nitrate in which the film-forming ingredients form an unusually high percentage for compositions of this type.

In preparing the cellulose derivative emulsions, the cellulose derivative is first colloided with solvents, plasticizers, etc., prior to emulsification in order to place it in a liquid condition so that it may be emulsified. A proportion of a suitable solvent is included to provide coalescence of the emulsion globules after the water has been eliminated from a deposited film thereby forming a continuous film. An exception may where there are sufficient thermoplastic ingredients present to cause the formation of a continuous film by a subsequent application of heat, although there is, of course, sufficient active solvents to completely colloid the cellulose derivative prior to the preparation of the emulsion. In general the ratio of film-forming solids to volatile ingredients in the present invention lies between 3 parts by weight of film-forming solids to 7 parts by weight of volatile ingredients and 6 parts by weight of film-forming solids to 4 parts by weight of volatile ingredients.

In the preparation of film-forming emulsions in solution form, practically all of the solvents utilized should be substantially non-miscible and entirely non-reacting with water. They should also be stable in systems wherein the outside phase is either slightly acidic or basic, the degree of stability necessary in any particular case depending on the specific requirements which the emulsions are designed to fill. Furthermore, in cases where the deposition of a continuous film is required, the solvent must have a sufficiently high vapor tension and latent heat of vaporization to be retained in the film until after the evaporation of the water phase is complete.

Representative solvents for the cellulose derivatives which are operable in the present invention are butyl acetate, isobutyl acetate, amyl acetate, isoamyl acetate, benzyl acetate, etc. As illustrated in the examples, suitable softeners, of the solvent and non-solvent type, may also be employed. Such materials as dibutyl phthalate, tricresyl phosphate, raw or blown castor oil and other blown, drying, semi-drying and non-drying oils may be incorporated in the compositions. Diluents either of the aliphatic hydrocarbon or the aromatic hydrocarbon type such as xylol, toluol, high flash naphtha, as well as the cyclic aliphatics obtained from asphaltic crude oils, may be included.

The foregoing examples illustrate the use of cellulose nitrates of a wide range of viscosity characteristics, depending upon the designed utility of the ultimate emulsion composition. Cellulose nitrates of viscosity characteristics ranging between 3/8 second and 20 seconds as determined by A. S. T. M. specifications D-301-33 may be successfully employed. Likewise, the viscosity characteristic of the cellulose acetate or cellulose ether is not critical, since suitable emulsions may be prepared from these materials whether of high or low viscosity characteristic.

The nitrogen content of the cellulose nitrate employed in preparing the emulsions of the present invention is not critical, and may vary between 10% and 12.5% depending upon the particular use for which the ultimate composition is intended.

The invention is not limited to the use of cellulose nitrate in any specific form, since any of the commercially available types in addition to the common nitrated cotton linters, such as nitrated regenerated cellulose, nitrated wood pulp, smokeless powder, etc., may also be utilized.

In conventional lacquer technology use is made of certain monohydric alcohols such as ethyl alcohol, butyl alcohol, isobutyl alcohol, amyl alcohol, etc., which in themselves are not solvents for cellulose nitrate, as fortifying solvents for the same. It has been found that certain of these alcohols which may be wholly or partially water miscible when present in relatively small amounts are advantageous in emulsification due to the fact that they lower the interfacial tension between the phases. Alcohols of this type are commonly known in the art as introfiers, and a definition closely resembling the above will be found in the "Laboratory Manual of Colloid Chemistry," by H. N. Holmes, published by John Wiley and Sons, New York (1934) pages 115 and 167. In addition numerous other liquids soluble in both phases function in this manner thus decreasing the work required to effect dispersion. Therefore, it is very important in the process of this invention dealing with the formation of high solids cellulose nitrate oil in water type emulsions, that in order to insure finished products of maximum stability that a portion at least of the medium effecting the dispersion of the cellulose nitrate (as an organophilic colloid) be capable of miscibility with the aqueous phase to an extent sufficient to permit the reduction of interfacial tension between the phases to a point where emulsification will be facilitated.

The significance of the above is further emphasized by the fact that if the organic material selected to effect the colloidal dispersion of the cellulose nitrate does not possess a certain degree of water miscibility as an inherent characteristic, then in the above described process at a point known as the first stage (the water in oil stage) instead of forming a well dispersed water in oil emulsion suitable for subsequent inversion, water separates from the system either in whole or in part with the formation of a dilute imperfectly dispersed water in oil emulsion which is difficult or impossible to invert. While it is recognized that such a product may be utilized to perform certain useful functions the conditions requisite to its formation are to be avoided in the practice of this invention involving the formation of high solids oil in water emulsions of colloided cellulose derivatives.

While stable dilute emulsions have been made which are composed merely of two non-miscible liquid phases, the preparation of a stable high solids cellulose derivative emulsion requires the presence of a third substance which is termed an emulsifying agent. These agents cover a wide range of different chemical types including sulfonated organic compounds, such as turkey red oil, alkaline lorol sulfates (Gardinols), sodium oleate, ammonium ricinoleate, alkaline lorol phthalates, etc. The polar type emulsifying agents function primarily to lower the interfacial tension between the two liquids, causing one liquid to disperse with respect to the other. They also function in a minor way to cause a desirable increase in viscosity in the phase in which they are more soluble.

As illustrated in the examples, the emulsions include more than one emulsifying agent, which are of different types. Example 1 illustrates the use of gum ghatti as a bodying type emulsifying agent and isopropyl naphthalene sodium sulfonate as a polar type emulsifying agent. In certain instances, the inclusion of several emulsifying agents has been found advantageous. It is essential in the present invention that at least one of the emulsifying agents be of the water colloided viscous type, specifically gum ghatti, in order to insure adequate body or consistency to form the paste type emulsion and to provide the superior chemical and mechanical stability which characterize the compositions of the present invention. The total amount of combined emulsifying agents present in the new compositions is preferably between 0.2 and 3.0% by weight of the total film-forming solids.

The new process and specific combination of emulsifying agents makes available, as an important and desirable advance in the art, cellulose derivative emulsions of unusually high film forming solids content, up to 60% and even more whereas cellulose derivative emulsions heretofore commercially available contained film forming solids only on the order of about 25%.

The products of the present invention are of particular value in coating the backs of rugs and carpeting. This is preferably carried out by reverse roller coating in conjunction with a doctor knife, although other methods of application are also permissible such as spray or brush operations. The coating binds the fabric pile of the carpeting, giving the semblance of a closer weave. The use of such coatings permits a less expensive weave if desired; and, in any event, the strength of the weave is increased and an improvement in general durability of the product is secured. Ravelling tendencies, usually encountered when uncoated carpeting is cut, are entirely eliminated.

The improved compositions are also of value in coating and/or impregnating a great variety of articles of manufacture such as paper, textiles, fabrics, cloth, wood and metal surfaces. In coating wood surfaces, it is desirable to first apply a water-resistant primer coating. A further commercial usage is indicated in the application of emulsions to the surface of linoleum. The products may also be used as adhesives which function by evaporation of the volatile constituents or they may also be prepared to function as heat energizable cements. In this connection, they are of particular merit in laminating cloth and other fabrics, manufacture of plywood, joining shoe parts, laminating paper, regenerated cellulose sheeting, etc. The emulsions may be used to produce clear, substantially colorless finishes or they may be colored with suitable pigments or other coloring matter to afford decorative and protective effects.

The process of the present invention offers considerable advantage in that low speed agitation may be used thus permitting the use of less expensive equipment and greatly simplifying industrial operations. The use of cellulose nitrate of high viscosity characteristic is permitted as is cellulose nitrate wet with water, thus extending the industrial usefulness of aqueous cellulose nitrate emulsions.

The products of the present invention are also characterized by high film-forming solids content, greater mechanical stability and improved stability in either the acidic or basic condition. A further advantage resides in the fact that these emulsions are capable of regeneration through simple stirring without incorporation of additional quantities of emulsifying agents after having been frozen and thawed.

Improved stability during shipping and extended storage periods is provided in the new products. Settling is substantially reduced and as a result they do not cream, thus preventing the formation of partially gelled skin.

The process is adapted for the preparation of cellulose derivative emulsions either by the method of direct formation of oil-in-water emulsions or by the inversion method.

It is apparent that many widely different embodiments of this invention may be made without departing from the spirit and scope thereof; and, therefore, it is not intended to be limited except as indicated in the appended claims.

We claim:

1. Process of claim 4 in which the cellulose derivative is dispersed in an organic liquid medium having an evaporation rate lower than that of water.

2. Process of claim 4 in which the cellulose derivative is dispersed in an organic liquid medium consisting of solvents and diluents one of which is at least partially miscible with water.

3. Process of claim 4 in which the cellulose derivative is wet with water.

4. The process of preparing oil-in-water emulsions having about a 25% to 60% non-volatile content and which is of paste-like consistency which comprises preparing a cellulose derivative solution in a water-immiscible and water-inert organic solvent, preparing a water dispersion of two colloidally dissolving emulsifying agents, one of which is of the polar type, and the other of which is gum ghatti, and combining the said cellulose derivative solution and the said dispersion of emulsifying agents by low speed mixing.

5. An oil-in-water emulsion of paste-like consistency prepared in accordance with the process of claim 4, said emulsion having a plurality of ingredients, the non-volatile content of which is of the order of 25% to 60%, the predominating solid ingredient of which is a cellulose derivative dissolved in a water immiscible and water-inert organic solvent, and as minor ingredients a plurality of colloidally dissolving emulsifying agents, one of which is of the polar type and the other of which is gum ghatti.

6. An oil in water emulsion of paste-like consistency prepared in accordance with the process of claim 4, said emulsion having a plurality of ingredients, the non-volatile content of which is of the order of 25% to 60%, the predominating solid ingredient of which is a cellulose derivative dissolved in a water immiscible and water-inert organic solvent, and as minor ingredients a plurality of colloidally dissolving emulsifying agents, one of which is of the polar type and the other of which is gum ghatti, the film-forming solids of the said emulsion being present in the ratio between 3 parts by weight of solids to 7 parts by weight of volatile ingredients and 6 parts by weight of solids to 4 parts by weight of volatile ingredients.

ALFRED DREYLING.
WILLIAM W. LEWERS.